United States Patent [19]

Tagami et al.

[11] Patent Number: 5,220,376
[45] Date of Patent: Jun. 15, 1993

[54] ARRANGEMENT FOR COMPENSATING FOR VARIABLE SPEED OF A CAMERA SHUTTER

[75] Inventors: Shigeru Tagami; Kazuo Akimoto; Kanji Ito; Katsuhiko Matsushita, all of Chiba, Japan

[73] Assignee: Seikosha Co., Ltd., Tokyo, Japan

[21] Appl. No.: 719,880

[22] Filed: Jun. 24, 1991

[30] Foreign Application Priority Data

Jun. 25, 1990 [JP] Japan .................. 2-67125[U]

[51] Int. Cl.$^5$ ............................................. G03B 7/097
[52] U.S. Cl. .................................................. 354/435
[58] Field of Search ................................ 354/435-439

[56] References Cited

U.S. PATENT DOCUMENTS

| 4,322,145 | 3/1982 | Yamada et al. | 354/435 |
| 4,763,155 | 8/1988 | Oda et al. | 354/435 |
| 4,835,564 | 5/1989 | Nakagawa et al. | 354/435 |
| 5,014,082 | 5/1991 | Farrington | 354/437 |

FOREIGN PATENT DOCUMENTS 62-163027  7/1987  Japan .
62-194239  8/1987  Japan .

Primary Examiner—W. B. Perkey
Attorney, Agent, or Firm—Jordan and Hamburg

[57] ABSTRACT

A camera shutter system has a motor driven sector for opening and closing a shutter opening. A photo-interruptor is positioned to intercept a light beam, to effect the outputting by the photo-interruptor of a signal pulse corresponding to the speed of the shutter. A memory storing exposure data, such as a matrix memory, is accessible as a function of the speed signal and an exposure quantity that is a function of the brightness of the brightness of an object to be photographed. The accessed exposure data is modified as a function of an observed exposure quantity.

7 Claims, 4 Drawing Sheets

ARRANGEMENT FOR COMPENSATING FOR VARIABLE SPEED OF A CAMERA SHUTTER

FIELD OF THE INVENTION

This invention relates to a camera shutter especially adapted to compensate, in a feedforward control manner, with disturbances such as decreasing of battery power, fluctuation of a discharging peak due to a conflict between the load of a motor for driving the camera shutter and other loads, and changing of the conditions of use of a camera, such as the sighting posture, temperature and humidity.

This invention is related to co-pending application Ser. No. 07/717,444, filed Jun. 19,1991, and Ser. Nos. 07/719,866 and 07/719,875, both filed on Jun. 24, 1991. The contents of these three applications are incorporated herein by reference.

BACKGROUND OF THE INVENTION

A sector forming a part of a camera shutter is generally a mechanical element which is actuated by rotating a motor to define an exposure quantity and an aperture diameter. As a consequence, if the rotation of the motor fluctuates due to a change in battery power, the exposure quantity and aperture diameter cannot be defined properly, and synchronized operation of a strobe light cannot be attained, thereby resulting in inferior photography.

According to Japanese Laid-Open Patent Document No. 61-163027"Speed Control Device of Camera Shutter Driving Motor", the shutter closing time relating to an exposure quantity $E_V$ is stored in a memory circuit in the form of data for the control of motor speed or data for the control of the width of driving pulses to be sent to a motor. As soon as the operating speed of a sector is detected, the width of the driving pulses is determined as a function of the data stored in the memory circuit, so that proper exposure is attained by controlling the rotational speed of the motor.

According to Japanese Laid-Open Patent Document No. 62-194239 "Camera Shutter Control Device", the time from the starting of rotation of a shutter driving motor to the time that a sector begins to open is detected, and in response to the time thus detected, the closing time of a shutter opening is set, so that a proper exposure is attained irrespective of battery voltage.

According to Japanese Laid-Open Patent Document No. 62-163027 and Japanese Laid-Open Patent Document No. 62-194239 as described above, in order to prevent the motor from operating improperly due to fluctuation in battery voltage, the rotational speed of the motor is controlled, or one data element from an exposure control data table is selected corresponding to brightness, as a function of the motor speed.

When the shutter sector is actuated by a motor whose rotor comprises a permanent magnet, however, the relationship between the opening diameter and the elapsed time changes due to several parameters, one of which is the speed of the sector.

Therefore, if the sector speed and the brightness are subjected to calculation and the calculation result is used to access the data, accurate control cannot be attained.

Further, if accurate calculation is desired, an arithmetic circuit for making the calculation must be complicated, and the volume of required data increases. It is, therefore, hard to control the actuation of the sector in a short time.

SUMMARY OF THE INVENTION

It is an object of the present invention to provide a camera shutter which in view of the above described difficulties of prior systems, can compensate, in a feedforward control manner, for disturbances resulting from, for example, decreasing of battery power, fluctuation of a discharging peak, and changing of the conditions of use of a camera, such as sighting posture, temperature and humidity. In accordance with the invention, means are provided for storing matrix data which is accessed as a function of an exposure quantity and a hierarchical sector open/close speed. The thus accessed matrix data is used to determine the width of driving pulses with which a sector for opening and closing a lens opening is driven. Data modifying means are provided for modifying the data in accordance with the difference between an observed exposure quantity and an intended quantity to correct the operation of the camera.

In accordance with the invention, the above object is attained by providing a camera shutter comprising a motor, a sector for opening and closing a shutter opening in response to rotation of the motor, and a photo-interruptor signal output means for detecting the position of the sector to deliver a photo-interruptor signal. Sector open/close speed detecting means are provided for detecting the speed of the sector immediately after its starting, in response to the photo-interruptor signal. An exposure quantity calculating means calculates an exposure quantity as a function of the brightness of an object to be photographed. The brightness is measured by photometer means. Memory means stores data which is accessed as a function of the exposure quantity calculated by the exposure quantity calculating means and the open/close speed of the sector detected by the sector open/close speed detecting means, in order to determine the width of driving pulses to be applied to the motor. Data modifying means are provided for modifying the accessed data from the memory means as a function of the difference between the exposure quantity calculated by the exposure quantity calculating means and an observed quantity.

BRIEF DESCRIPTION OF THE DRAWINGS

An embodiment of a camera shutter according to the present invention will now be described in greater detail with reference to the accompanying drawings.

DESCRIPTION OF THE PREFERRED EMBODIMENTS

Figure 1:
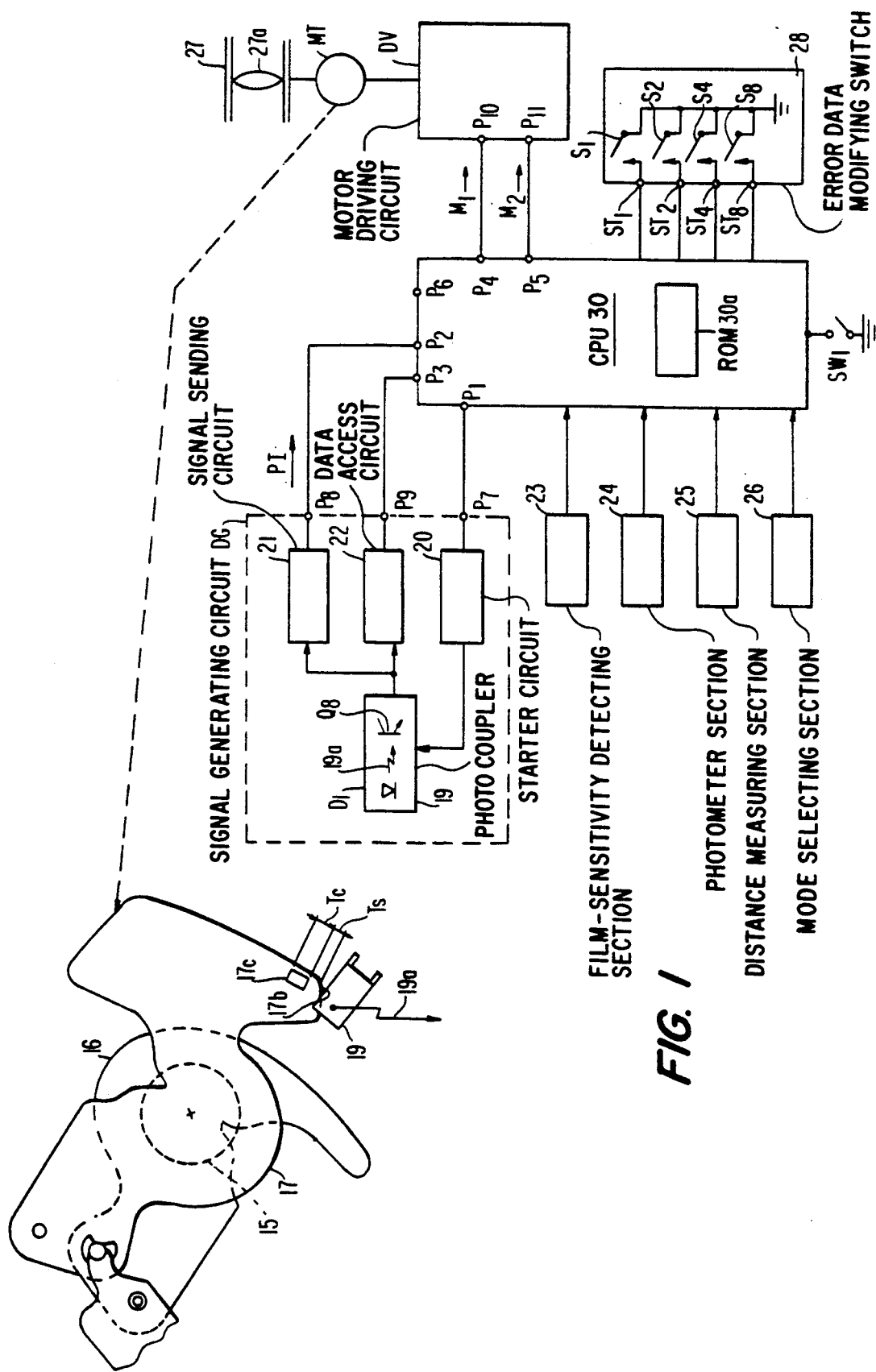
FIG. 1 is a block diagram of a camera shutter according to the present invention.

As shown in FIG. 1, a camera shutter comprises a motor MT for moving sectors 16 and 17; a PI signal generating circuit DG including a photo coupler 19 comprised of a light emitting diode $D_1$ and a light receiving transistor $Q_8$, a starter circuit 20, a PI signal sending circuit 21, and a data access circuit 22. The shutter further includes an error data modifying switch 28; a motor driving circuit DV including transistor $Q_1$ through $Q_6$ for driving a motor coil MC; and a CPU 30 including a ROM 30a. This CPU 30 stores a program for calculating an exposure quantity on the basis of the brightness of an object to be photographed which is measured by a photometer section 24.

Figure 2:
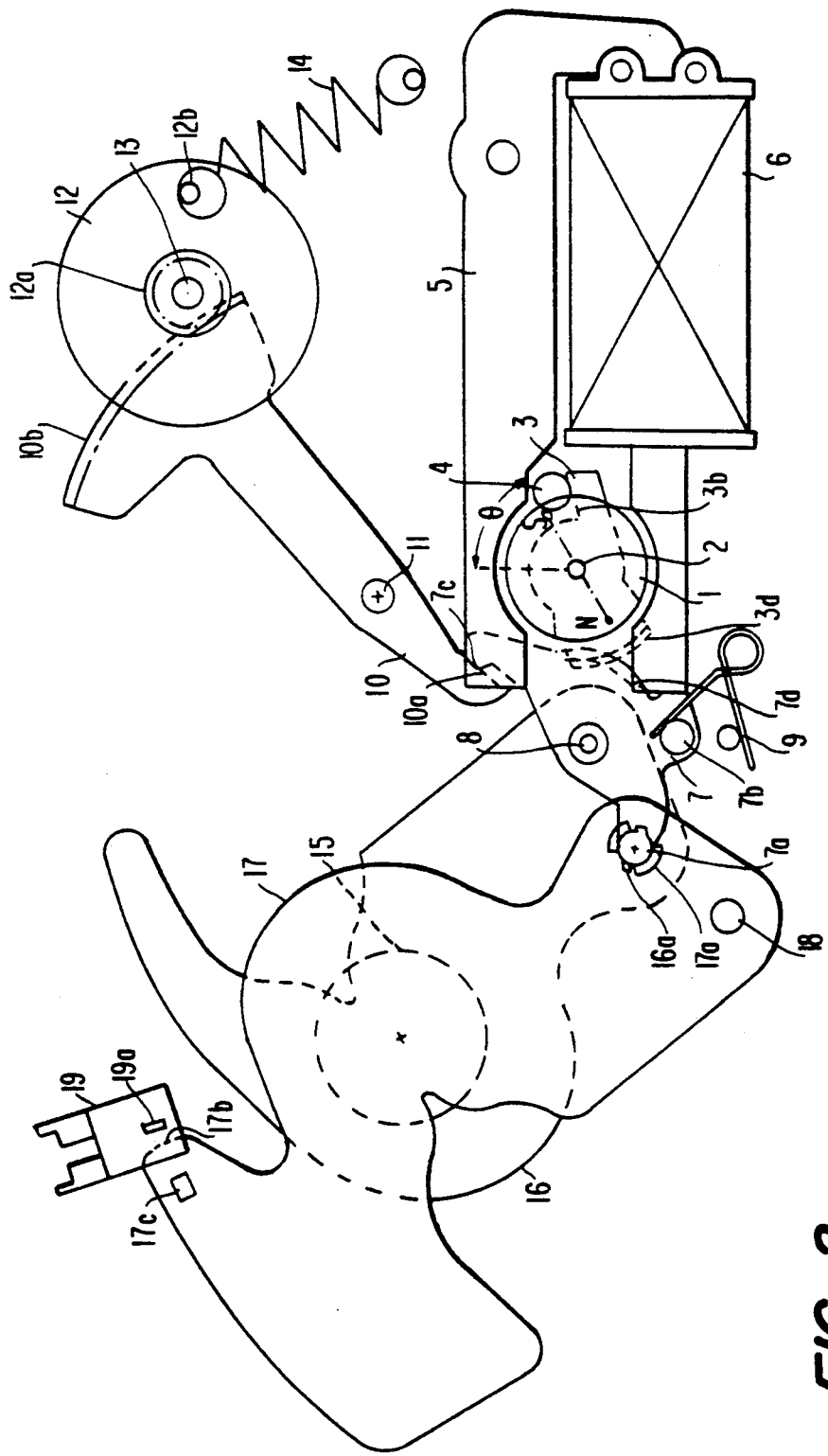
FIG. 2 is an enlarged structural diagram showing sectors and a rotor of the shutter of FIG. 1.

As shown in FIG. 2, the rotor 1 of a motor MT is comprised of a permanent magnet radially magnetized to exhibit two poles. A rotor shaft 2 is press-fit to the rotor at the center of the magnet. A rotor pinion 3 has a gear portion 3a in engagement with a gear portion 7d of an open/close lever 7, and an arm portion 3b acting as stopper. This arm portion 3b is designed so that when a motor coil 6 on a stator 5 is not energized, the rotor 1 stops at an angular displacement $\theta$ of about 58 degrees with respect to a stationary position. This angle is determined by the press-fit angle of the arm portion 3b of the rotor pinion 3 with respect to the magnetization angle of the rotor 1.

The stator 5 and motor coil 6 are positioned outside the rotor 1. The motor coil 6 can be energized in both, forward and backward directions, that is, the sectors 16 and 17 open in response to forward energization of the coil and close in response to backward energization of the coil. Specifically, when the motor coil 6 is forwardly energized at one electric polarity, the magnetic pole of the stator 5 and the opposing magnetic pole of the rotor 1 assume the same magnetic polarity, so that the rotor 1 is repulsed and rotated. Backward energization of the coil produces the opposite result.

The open/close lever 7 has a pin 7a for driving the sectors 16 and 17. A protrusion 7b of the lever 7 serves as the point of action of a spring 9. A projection portion 7c is provided for pushing an intermediate lever 10. The gear portion 7d of the lever 7 engages the rotor pinion 3.

The spring 9 urges the open/close lever 7 in the shutter closing direction, so that even when the motor coil 6 is not energized, the sectors 16 and 17 are urged by the spring 9 from the open position toward the closed position.

The intermediate lever 10 has an arm portion 10a acting on the open/close lever 7 and a gear portion 10b engaging a gear portion 12a of the flywheel 12. This flywheel 12 has a gear portion 12a and a protrusion 12b on which a flywheel spring 14 acts. The flywheel spring 14 urges the flywheel 12 and the intermediate lever 10 in the shutter closing direction. In the initial state of the shutter, the intermediate lever 10 abuts the projection portion 7c of the open/close lever 7.

The sector 16 is pivoted at the rotational center 8 of the open/close lever 7, and the pin 7a is rotatably fitted in a slot 16a.

The sector 17 is pivoted to a front casing 18, and the pin 7a fitted in the sector 16 is rotatably fitted in a slot 17a in the same manner as the sector 16.

The sector 17 has an edge 17b and a rectangular hole 17c, this edge and hole selectively intercepting and passing a light beam 19a of the photo coupler 19.

The photo coupler 19 is designed so that a peripheral portion of the sector 7 is inserted between its light emitting and light receiving sections in dependence upon the displacement of the sector 7. A photo-interruptor signal (referred to as PI signal) output from the photo coupler 19 assumes an L level in the initial state when the beam is not intercepted, and an H level when the sector 17 is driven to intercept the beam 19a. Further, the signal again assumes the L level when the beam passes through the rectangular hole 17c and the H level when the edge of the rectangular hole 17c intercepts the beam.

Figure 3:
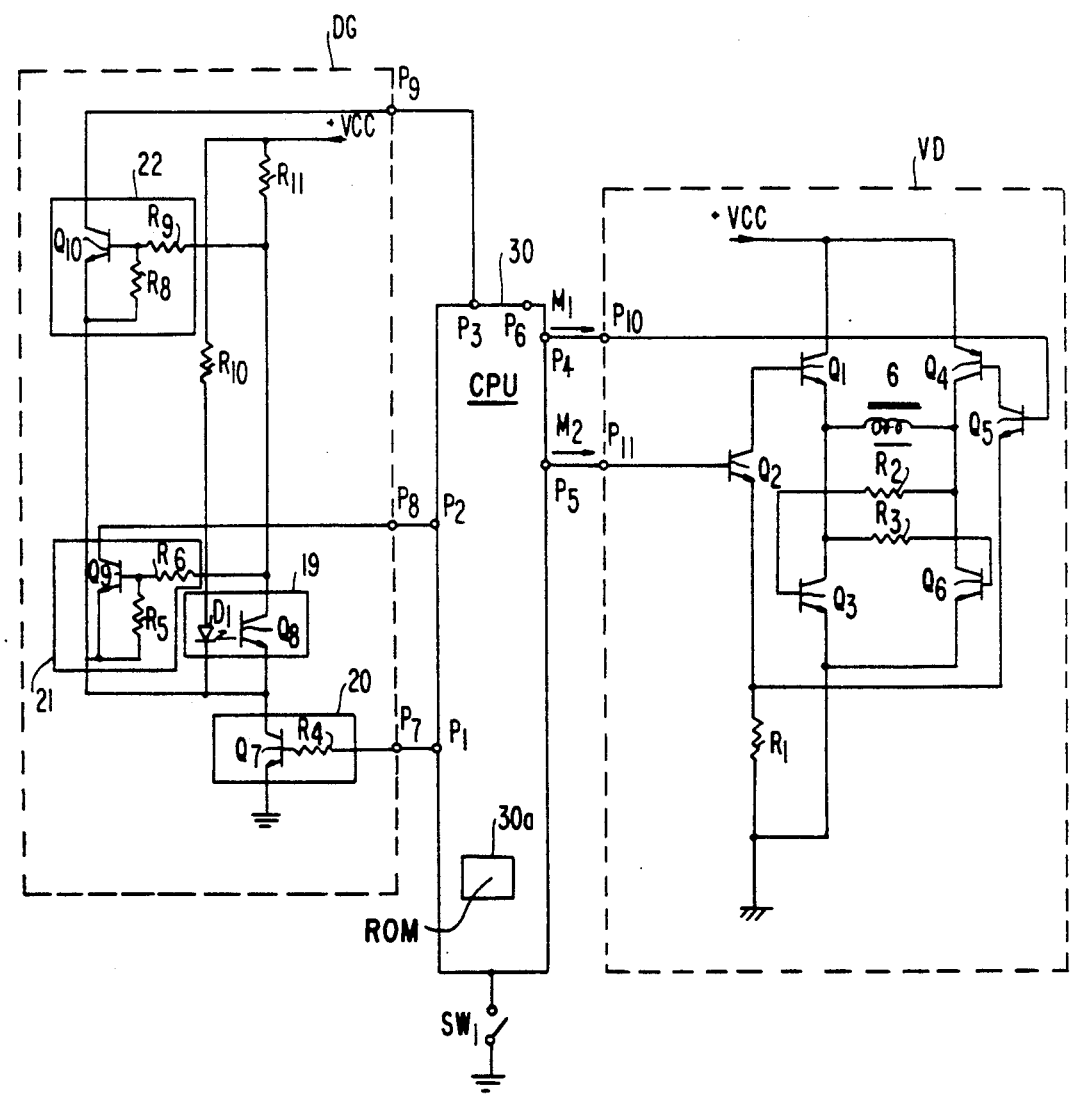
FIG. 3 is a circuit diagram showing a portion of FIG. 1.

As shown in FIG. 3, the PI signal generating circuit DG and the motor driving circuit DV of FIG. 1 are designed so that the pins $P_1$, $P_2$, $P_3$ and $P_4$, $P_5$ of the CPU 30 are connected to the pins $P_7$, $P_8$, $P_9$ of the PI signal generating circuit DG and the pins $P_{10}$, $P_{11}$ of the motor driving circuit DV, respectively.

The starter circuit 20 of the PI signal generating circuit DG is comprised of a transistor $Q_7$ and a resistor $R_4$. The base of the transistor $Q_7$ is connected via the resistor $R_4$ to the pin $P_7$ and its emitter is connected to a reference potential point. When driven by the CPU 30, the transistor $Q_7$ turns on to couple the reference potential point to the photo coupler 19, PI signal sending circuit 21, and data access circuit 22 via the collector of transistor $Q_7$.

The cathode of the light emitting diode $D_1$ and the emitter of the light receiving transistor $Q_8$ in the photo coupler 19 are connected to the collector of the transistor $Q_7$, and the anode of the light emitting diode $D_1$ and the collector of the light receiving transistor $Q_8$ are connected to a power source $+V_{cc}$ via resistors $R_{10}$ and $R_{11}$, respectively.

The base of a transistor $Q_9$ of the PI signal sending circuit 21 is connected via a resistor $R_6$ to the collector of the light receiving transistor $Q_6$. Its emitter is connected to the collector of the transistor $Q_7$, and its collector is connected to the pin $P_8$ so that the PI signal is applied from the collector to the pin $P_8$.

The base of a transistor $Q_{10}$ of the data access circuit 22 is connected via a resistor $R_9$ to the collector of the light receiving transistor $Q_8$, and its collector is connected to the pin $P_9$.

The respective bases of the transistor $Q_2$ and $Q_5$ of the motor driving circuit DV are connected to the pins $P_{11}$ and $P_{10}$, respectively, and the $M_1$ and $M_2$ signals are normally at the L level. When the $M_1$ signal assumes an H level with the $M_2$ signal at the L level, the transistors $Q_5$, $Q_3$ and $Q_4$ turn on to energize the motor coil 6 in the direction of the solid-line arrow, so that the sectors 16 and 17 are opened. On the other hand, when the $M_2$ signal assumes an H level, the transistors $Q_2$, $Q_1$ and $Q_6$ turn on, so that the sectors 16 and 17 are closed.

Figure 4:
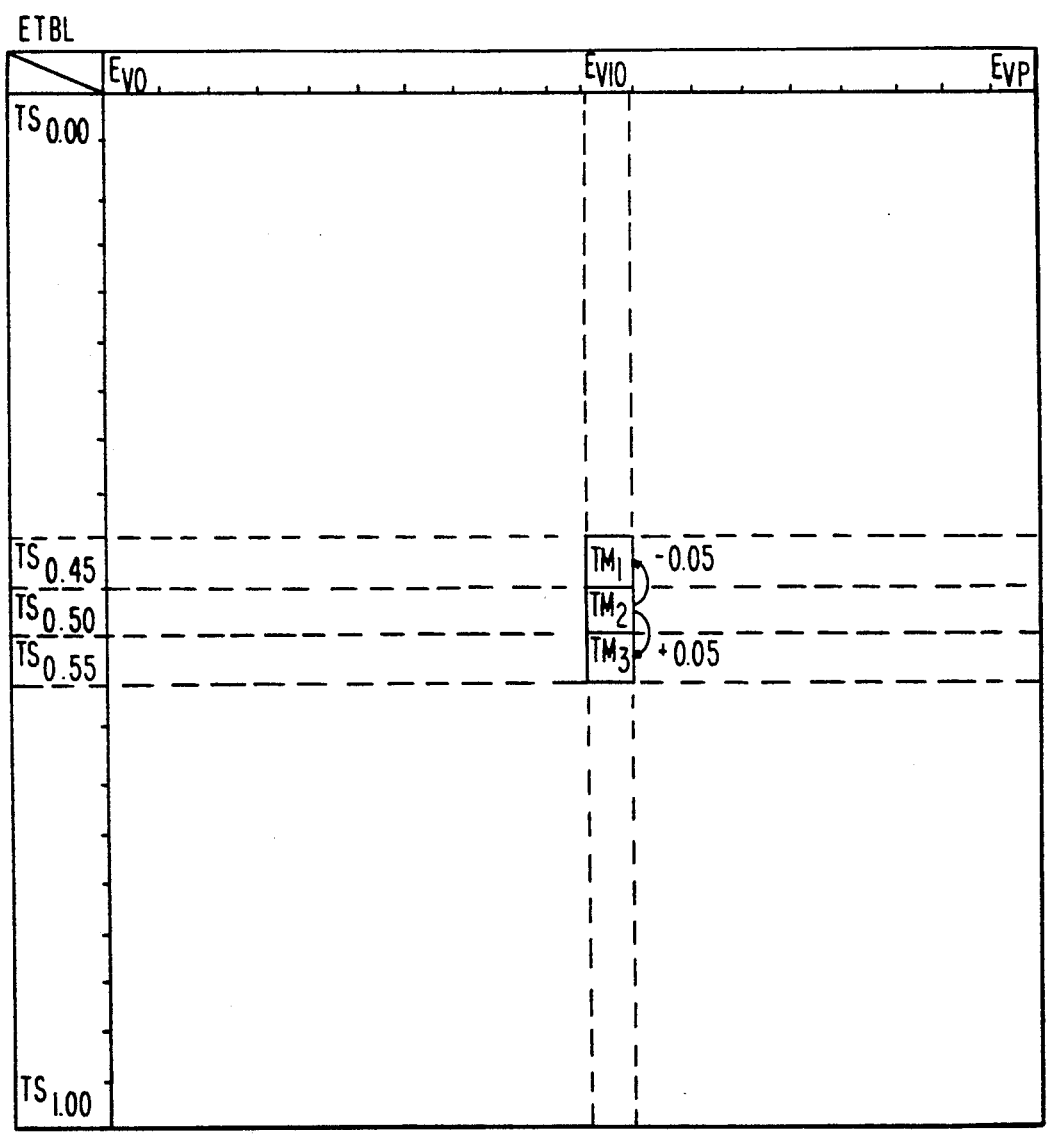
FIG. 4 is a structural diagram of a shutter exposure pulse table.

The ROM 30a of the CPU 30 contains a shutter-exposure pulse data table ETBL as shown in FIG. 4.

The shutter-exposure pulse data table ETBL is comprised of shutter-exposure pulse data elements $TM_n$ which are accessed in matrix form as a function of a starting speed coefficient ranging from 0 to 1 and an exposure quantity represented by $E_{VO}$ to $E_{VP}$. For example, the shutter-exposure pulse data element $TM_2$, referenced by the exposure quantity $E_{V10}$ and the starting speed coefficient 0.05, changes to $TM_1$ when the starting speed coefficient decreases by 0.05 and to $TM_3$ when it increases by 0.05.

Assume that TS represents the distance from the edge 17b to the leading edge of the rectangular hole 17c of the sector 17 shown in FIG. 1, that beam width TC represents the distance from the leading edge to the trailing edge of the rectangular hole 17c, and that TM represents the distance from the trailing margin. Accordingly, after the sector 17 begins to move, the shutter-exposure pulse data table ETBL is referred to using the starting speed coefficient TS of FIG. 4 as defined above.

In FIG. 1, block 23 is a film-sensitivity detecting section, block 25 is a distance measuring section, block 26 is a mode selecting section, block 27 is a lens-barrel, block 27a is a lens, and $SW_1$ is a release button.

OPERATION OF THE INVENTION

In the above described camera shutter, when the release button $SW_1$ is depressed, rotation of the motor causes the edge 17b of the sector 17 to be inserted between the light emitting diode $D_1$ and light receiving transistor $Q_8$ of the photo coupler 19, to intercept the light beam 19a. As a result, the PI signal is output from the PI signal sending circuit 21 to the pin $P_2$ of the CPU 30. The PI signal causes the photo coupler 19 to operate for a given interval of time until the optical axis of the photo coupler 19 comes into alignment with the hole section 17c of the sector 17. The elapsed time up to this moment allows a prediction of the speed of the sector 17 passing along the TS, TC and TM shown in FIG. 1. That is, when the speed of the sector 17 is relatively fast under the influence of voltage, temperature, etc., the time becomes relatively short, whereas when the speed is slow, the time becomes relatively long. In this way, the starting speed coefficient TS is determined, and consequently, the shutter-exposure pulse data element $TM_2$ shown in FIG. 4 is read out in the row end column where the exposure quantity $EV_{10}$ is given. Since the exposure pulse data element $TM_2$ is a common mean value, where a trial-use camera has that mean value, the matrix data resulting from the exposure quantity $EV_{10}$ and the starting speed coefficient $TS_{0.05}$ is the exposure pulse data element $TM_2$ shown in FIG. 4. If an error arises when the trial-use camera is driven with the exposure pulse data element $TM_2$, the setting switches $S_1$, $S_2$, $S_4$ and $S_8$ of the error data modifying switch 28 are set manually or by a shutter regulation unit (not shown) to be on or off. The setting condition of the setting switches $S_1$, $S_2$, $S_4$ and $S_8$ is determined by setting terminals $ST_1$, $ST_2$, $ST_4$ and $ST_8$ (a number ranging from 0 to 15 can be represented by a combination of subscripts). For example, when the number "0" corresponds to the mean value, the number "1" means shifting from the exposure pulse data element $TM_2$ to the exposure pulse data element $TM_1$ as referenced by $TS_{0.45}$ corresponding to "−0.05" and the exposure quantity $E_{V10}$. For a change in the number from 1 to 7, the starting speed coefficient shifts to $TS_{0.15}$ in decrements of 0.05. Similarly, for a change in the number from 8 to 15, the starting speed coefficient shifts from $TS_{0.55}$ corresponding to the exposure pulse data element $TM_3$ to the starting speed coefficient $TS_{0.90}$, in increments of 0.05.

In the above described embodiment of the invention, the data processing operation between the CPU 30 and the PI signal generating circuit DG, inclusive of the starter circuit 20, PI signal sending circuit 21, and data access circuit 22, may be changed to a serial mode of operation so that the pins $P_1$, $P_2$, $P_3$, $P_7$, $P_9$ and $P_8$ can be combined.

The camera shutter according to the present invention comprises a motor, a sector for opening and closing a shutter opening in response to the rotation of the motor, and a photo-interruptor signal output means for detecting the position of the sector to deliver a photo-interruptor signal. Sector open/close speed detecting means are provided for detecting the speed of the sector immediately after its starting, in response to the photo-interruptor signal. An exposure quantity calculating means calculates an exposure quantity as a function of the brightness of an object to be photographed. The brightness is measured by photometer means. Memory means are provided for storing data accessed as a function of the exposure quantity calculated by the exposure quantity calculating means and the open/close speed of the sector detected by the sector open/close speed detecting means, to determine the width of driving pulses to be applied to the motor. Data modifying means are provided for modifying the accessed data from the memory means as a function of the difference between the exposure quantity calculated by the exposure quantity calculating means and an observed exposure quantity. As a result, disturbances resulting from changing of the conditions of use of the camera, such as sighting posture, temperature and humidity, can be compensated for, in an open-loop feedforward control manner, and an error of exposure quantity of the camera can be corrected.

Although the present invention has been fully described by way of example with reference to the accompanying drawings, it is to be understood that various changes and modifications will be apparent to those skilled in the art. Therefore, unless otherwise such changes and modifications depart from the scope of the invention, they should be construed as being included therein.

What we claim is:

1. A camera shutter comprising a motor, a sector for opening and closing a shutter opening in response to the rotation of the motor, photo-interruptor signal output means for detecting the position of the sector to output a photo-interruptor signal, sector open/close speed detecting means for detecting the speed of the sector immediately after its starting in response to the photo-interruptor signal, exposure quantity calculating means for calculating an exposure quantity as a function of the brightness of an object to be photographed, memory means having shutter exposure data stored therein, means for accessing said memory means as a function of said exposure quantity and said open/close speed of the sector to access therefrom data corresponding to the width of driving pulses to be applied to the motor, and data modifying means for modifying the data accessed from the memory means as a function of the difference between the exposure quantity calculated by the exposure quantity calculating means and an observed exposure quantity.

2. A camera shutter according to claim 1 further comprising a photometer for detecting the brightness of said object for application to said exposure quantity calculating means.

3. A camera shutter system comprising a motor, a sector responsive to rotation of said motor for opening and closing a shutter opening, a photo-interruptor including a source of a light beam and a receiver positioned to receive said light beam, said sector having means for intercepting said beam upon rotation of said sector to control said photo-interruptor to output a photo-interruptor signal substantially immediately after the start of a picture taking sequence, whereby said photo-interruptor outputs a speed signal corresponding to the speed of the sector, exposure quantity calculating means for calculating an exposure quantity that is a function of the brightness of an object to be photographed, a memory storing exposure data therein, means for accessing said memory as a function of said exposure quantity and said speed signal, data modifying means for modifying exposure data accessed from said memory as a function of an observed exposure quantity, for determining the width of driving pulses to be applied to said motor for energizing the motor, and means for controlling the rotation of said motor as a function of data modified by said modifying means.

4. A camera shutter system according to claim 3, wherein said memory comprises a matrix memory connected to be accessed on a first coordinate axis by said speed signal and on a second coordinate axis by said exposure quantity.

5. A camera shutter system according to claim 3, wherein said means for modifying comprises manually operable switch means for modifying said exposure data.

6. A camera shutter system of claim 3, wherein said means for modifying comprises means for automatically modifying said exposure data.

7. A camera shutter system according to claim 4, wherein said means for modifying comprises means for accessing said first axis at a location corresponding to a speed that differs from the speed corresponding to said speed signal.

* * * * *